United States Patent [19]

Krauss

[11] 4,028,003

[45] June 7, 1977

[54] TORSIONALLY COMPLIANT HELICOPTER ROTOR BLADE WITH IMPROVED STABILITY AND PERFORMANCE CHARACTERISTICS

[75] Inventor: Timothy A. Krauss, Sandyhook, Conn.

[73] Assignee: United Technologies Corporation, Hartford, Conn.

[22] Filed: Apr. 12, 1976

[21] Appl. No.: 675,664

[52] U.S. Cl. .......................... 416/141; 416/132 R; 416/226; 416/241 A
[51] Int. Cl.² ............................................ B64C 27/44
[58] Field of Search .......... 416/132, 141, 230, 226, 416/241 A, 134 A

[56] References Cited
UNITED STATES PATENTS

| | | | |
|---|---|---|---|
| 3,232,349 | 2/1966 | Ballauer | 416/141 |
| 3,237,697 | 3/1966 | Ford et al. | 416/229 X |
| 3,310,117 | 3/1967 | Slivinsky et al. | 416/226 |
| 3,484,174 | 12/1969 | McCoubrey | 416/132 |
| 3,528,753 | 9/1970 | Dutton et al. | 416/226 |
| 3,552,881 | 1/1971 | Rogers et al. | 416/226 X |
| 3,669,566 | 6/1972 | Bourquardez et al. | 416/134 A |
| 3,713,753 | 1/1973 | Brunsch | 416/226 |
| 3,874,820 | 4/1975 | Fenaughty | 416/226 |
| 3,926,536 | 12/1975 | Ciastula et al. | 416/141 X |
| 3,999,886 | 12/1976 | Ormiston et al. | 416/138 X |

Primary Examiner—Everette A. Powell, Jr.
Attorney, Agent, or Firm—Vernon F. Hauschild

[57] ABSTRACT

A torsionally compliant helicopter rotor blade with maximum blade torsional flexibility at the blade tip portion and so shaped at the blade root portion that the locus of shear centers and the locus of centers of lift are substantially coincident, and so shaped at the tip portion so that the locus of shear centers is selectively forward of the locus of centers of lift to establish an aerodynamic restoring moment in response to blade tip torsional excursions, thereby improving blade torsional stability.

9 Claims, 3 Drawing Figures

TORSIONALLY COMPLIANT HELICOPTER ROTOR BLADE WITH IMPROVED STABILITY AND PERFORMANCE CHARACTERISTICS

The invention herein described was made in the course of or under a contract or sub-contract thereunder, with the Department of the Navy.

BACKGROUND OF THE INVENTION

1. Field of the Invention

This invention relates to helicopter blades and more particularly to torsionally flexible helicopter blades selectively shaped to effect blade torsional stability.

2. Description of the Prior Art

In the past, helicopter blades have been made relatively inflexible so that minimum torsional excursions of the blade in operation were encountered. U.S. Pat. No. 2,754,918 is typical of such prior art construction. With advances in technology and the attendant demand for improved performance, helicopter blades are now designed with thin airfoils generally diminishing in thickness between the blade root and the blade tip for improved aerodynamic performance. Further, many helicopter blades are currently made of composites with their inherent low shear stiffness properties. In view of the thin tip airfoil and the composite construction, the modern helicopter blade is torsionally compliant, meaning torsionally flexible, and the torsional deflections or excursions at the blade tip are primarily due to the elastic twisting of the rotor blade structure due to the imposition of aerodynamic or inertia loads thereon. A typical example of such a torsionally compliant modern helicopter blade is shown in Fenaughty U.S. Pat. No. 3,874,820 and U.S. Pat. Nos. 3,728,045 and 3,822,105.

Efforts have been made to introduce torsional stability into such torsionally compliant blades, but none have been fully satisfactory. For example, blades have been made with a swept tip as shown in U.S. Pat. No. 3,721,507 in an effort to produce torsional stability but such swept tip constructions have the inherent disadvantage that they generate lift in the swept portion of the blade at a station displaced from the blade feathering axis and thereby imposing loads on the blade control system during all modes of operation.

The selective positioning of the elastic axis is known in the fixed wing sailplane art wherein in U.S. Pat. No. 3,561,702 the fixed sailplane wing is swept aft of the elastic axis of the wing root to produce twisting of the wind about this axis due to changes in lift. This sailplane patent twists the total wing about the wing root, with the region of maximum twisting located adjacent the root. Contrary to this sailplane teaching, my invention involves tailoring the structural shear centers locally along the blade span to provide local twisting of these sections due to airloads generated outboard of the sections. In particular the shear centers are tailored to be forward of the center of lift at the blade tip so that the torsionally flexible tip sections twist nose down locally due to changes in upward lift or vice versa. With my construction the changes in lift produce no appreciable twisting moment about the blade root sections since at these sections the centers of lift and the centers of shear are coincident and hence no control loads are created by my invention. The swept wing sailplane of U.S. Pat. No. 3,561,702 can be likened to the swept wing helicopter blade discussed hereinafter.

The purpose of this invention is to effect torsional stability in a torsionally compliant helicopter rotor blade.

SUMMARY OF INVENTION

A primary object of the present invention is to utilize the torsional flexibility of a torsionally compliant helicopter rotor blade to increase the torsional stability of the blade.

In accordance with the present invention, such torsional stability can be achieved without imposing loads on the blade control system.

It is still a further object of the present invention to effect torsional stability in such a torsionally compliant blade by shaping the blade root portions so that the locus of shear centers and the locus of centers of lift at the root portion are substantially coincident and shaping the blade tip portions so that the locus of shear centers is selectively positioned forward of the locus of centers of lift to thereby establish an aerodynamic restoring moment in response to blade tip portion torsional excursions due to aerodynamically imposed loads, thereby establishing blade torsional stability.

A further object of this invention is to increase the effective torsional stiffness of a torsionally compliant helicopter blade by positioning the blade section shear center forward of the blade section center of lift at the blade tip.

In accordance with a further aspect of the present invention, a tip stall condition may be relieved in a negative twist torsionally compliant blade having maximum negative twist at the blade tip portion by so selectively positioning the aforementioned loci to thereby produce a twist restoring force in the advancing blades in forward flight mode to thereby reduce the angle of attack and negative tip twist and hence reduce or eliminate tip stall.

It is a further feature of this invention to counteract the general destabilizing effects of drag forces on torsional motion of the blade, for instance, when utilized in a negative twist torsionally compliant blade with maximum negative twist at the blade tip, to produce an aerodynamic restoring force to counteract the negative twist increasing drag moment caused by tip downward displacement with respect to the root in advancing blade positions during flight mode of operation.

In accordance with a further teaching of this invention, the feathering axis may be selectively positioned to produce minimum control loads at a selected mode of operation by independently selectively positioning the aforementioned loci to produce the aerodynamic twist restoring force to overcome the possible destabilizing aerodynamic effects of such feathering axis relocation.

It is still a further object of this invention to utilize the aforementioned selectively positioned loci to permit the use of less built-in twist in a torsionally compliant helicopter blade wherein said aforementioned displaced loci will produce an aerodynamic twist creating moment at the blade tip which is additive to the built-in twist to thereby produce optimum total twist for hover mode of operation.

It is still a further object of this invention to utilize the aforementioned displaced loci to increase the torsional natural frequency of the blade through use of the aerodynamic restoring spring to increase the effective torsional stiffness of the blade.

DESCRIPTION OF THE PREFERRED EMBODIMENT

Figure 1:
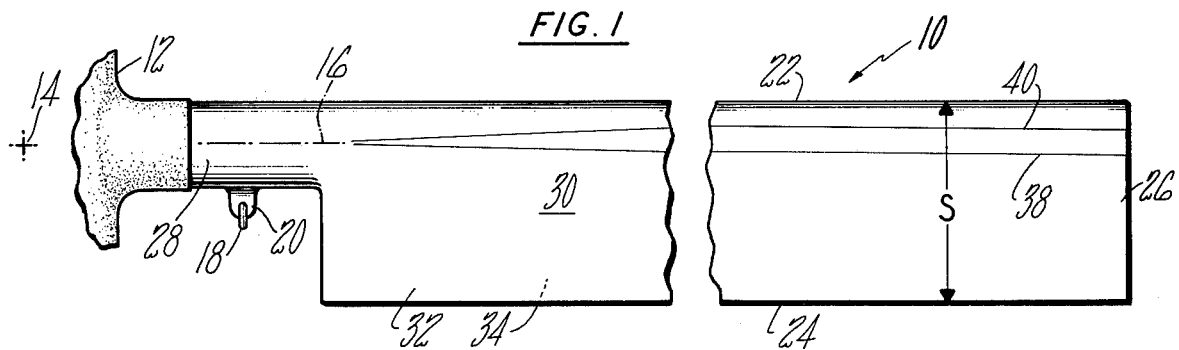
FIG. 1 is a top view of a torsionally flexible helicopter blade using my invention.

Referring to FIG. 1 we see torsionally compliant helicopter blade 10 supported from rotor hub 12 for rotation therewith about axis 14 and for pitch change motion about feathering or pitch axis 16 as control inputs are imparted to the blade by the pilot through control rod mechanism 18 and pitch horn 20. Blade 10 may be supported from hub 12 in conventional fashion, for example as shown in U.S. Pat. No. 3,764,230 or in U.S. Pat. No. 3,097,701.

Blade 10 includes a leading edge 22, a trailing edge 24, blade chord S extending between the leading and trailing edges, tip portion 26, root portion 28, and airfoil portion 30 extending between root portion 28 and tip portion 26. Blade 10 is of the torsionally flexible or compliant type and may be of the type shown in Fenaughty U.S. Pat. No. 3,874,820 or U.S. Pat. No. 3,728,045.

For optimum performance, blade 10 is made so that the blade thickness, that is the blade dimension between the blade top surface 32 and the blade bottom surface 34, diminishes between the blade root portion 28 and the blade tip portion 26 and wherein the thickness of the blade tip portion 26 is very thin so that the blade tip portion is of maximum relative torsional compliance or flexibility.

While torsionally compliant or flexible helicopter blade 10 has many advantages over the prior art blades discussed supra, including improved performance, strength, and reduced weight, the torsional flexibility of the blade may introduce problems which will be discussed hereinafter in the explanation of my invention which relieves these problems.

The purpose of my invention is to take advantage of this torsional flexibility in modern helicopter blades and, rather than let it work as a disadvantage, to utilize the torsional flexibility to increase blade torsional stability in a manner now to be described.

Figure 2:
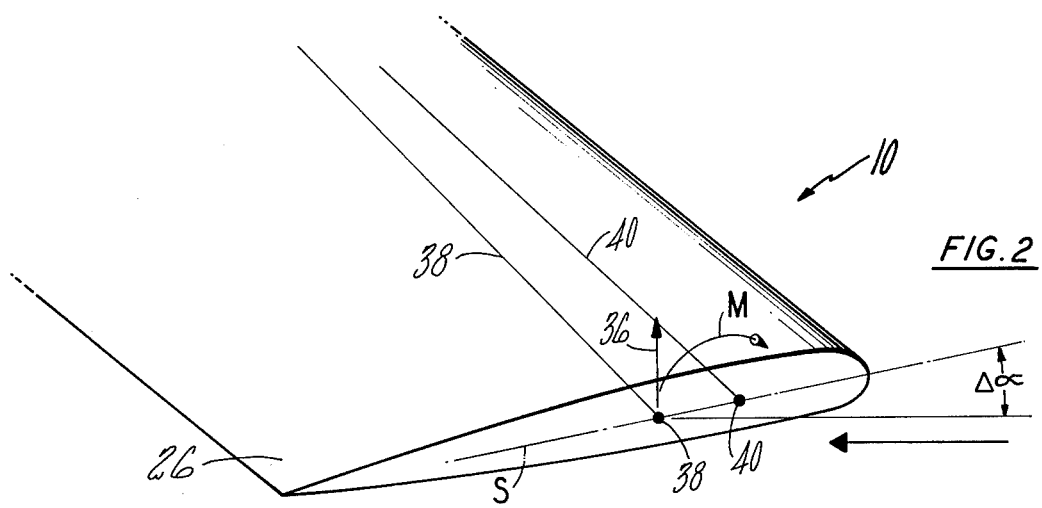
FIG. 2 is a showing of the tip portion of such a helicopter blade illustrating my invention.

During normal helicopter flight operation, torsionally compliant blade 10 may experience torsional deflections or excursions due to pilot imposed pitch change control loads or the imposition thereon of aerodynamic loads caused by wind gusts, stall and general maneuvering. The immediate result of any of these occurrences is to produce a lift vector 36 on the blade at the locus of the center of lift at each station 38 as shown in FIG. 2. An important teaching of my invention is that blade 10 be designed and fabricated so that the locus of shear centers, shown at 40 in FIG. 2, is positioned forward of the locus of centers of lift 38 at the blade tip portion 26 and substantially coincident therewith, as shown in FIG. 1 at blade root portion 28. While these loci are shown as straight lines, it will be evident to those skilled in the art that they are not necessarily straight lines and it will also be evident to those skilled in the art that these loci can be selectively positioned by the manner in which blade 10 is fabricated using conventional fabricating procedures.

The shear center at any blade station can be defined as the point in that blade station where the blade load force can be applied and there will be no resultant blade twisting. The center of lift can be defined at any blade station as the chordwise position where the resultant section aerodynamic lift forces acts.

By viewing FIG. 2, it will be noted that due to the displacement along chord S of loci 38 and 40, the load so imparted to blade 10 at locus 38 will impose a blade torsional or twisting moment M about locus 40. The effect of this torsional moment M is maximum at blade tip portion 26 since this is the blade portion of maximum torsional compliance or flexibility. Moment M is seen to be a clockwise moment for the positive lift condition about locus 40 which serves to untwist or unwind the blade to thereby reduce the angle of attach $\alpha$ of the blade to thus restore the blade to or toward its aerodynamically untwisted position. Moment M is actually an aerodynamic spring moment created by the selective positioning of loci 38 and 40 which serves as the restoring force to the blade tip when the blade tip is caused to elastically twist or to change pitch due to pilot control inputs. If loci 38 and 40 had not been displaced as shown in FIG. 2 but were coincident as in most helicopter blades, the result of such aerodynamic forces imposed upon blade 10 by wind gusts, stall, and general maneuvering of the helicopter would be to produce possible severe torsional excursions in the blade tip with attendant problems, such as tip stall, increased drag, increased control loads and high blade stresses.

A very important feature of my invention is that the restoring aerodynamic spring represented by moment M in FIG. 2 can be produced without imposing significant control loads on the blade pitch control system if the pitch axis 16 is independently placed on the line through the locus of lift centers substantially throughout the blade span. In this instance, the lift forces imposed upon blade 10 will cause no torsional moment about the pitch axis and will not attempt to impart pitch change to the blade and thereby load the blade control system.

Figure 3:
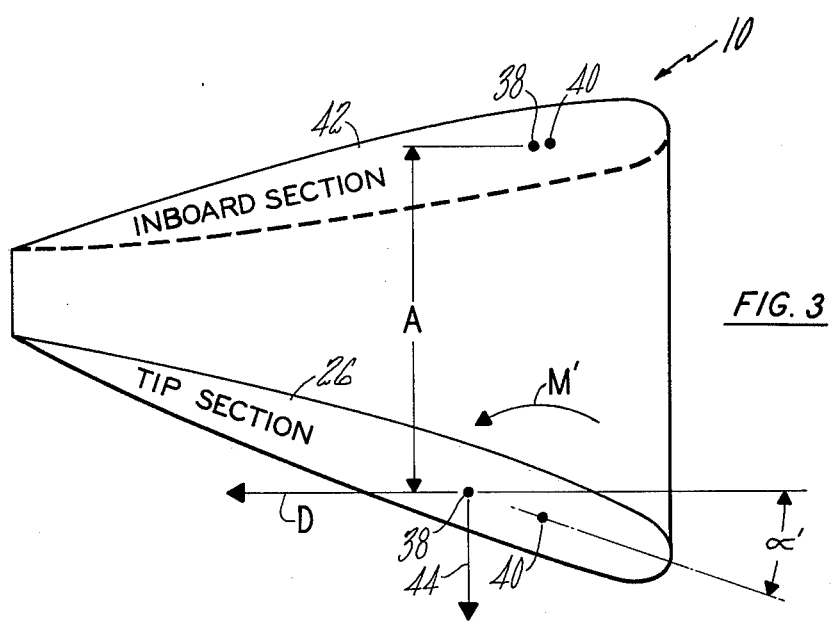
FIG. 3 is a sectional showing at a blade inboard station and at a blade tip station illustrating my invention.

Preferably the twist of blade 10 is negative, that is increasing negatively from root 28 to tip 26 so as to be most negative at tip portion 26 to maximize hover performance. This can become a problem in forward flight mode, especially with high twist blades, in that the blade in this forward flight position operates at low pitch and the blade tip operates actually at negative lift because of the high negative twist and will eventually stall in this position. High control loads will result from this condition and the increased drag produced by the stall can be a significant power penalty. This situation is made worse by drag forces as will be explained farther on. The method by which this invention will relieve this situation will be explained by viewing FIG. 3. In FIG. 3, both a blade inboard section, such as a root section 42 and a blade tip section 26 are illustrated. By viewing FIG. 3, we see blade tip section 26 in its negative lift position wherein negative lift vector 44 acts through locus 38 to produce a counterclockwise moment M' about locus 40 to serve to untwist the blade by bringing it nose up to reduce the negative angle of attack $\alpha'$ thereon and thereby eliminate or reduce the tip stall condition which is created by the high negative angle of attach $\alpha'$ shown in FIG. 3. It will therefore be seen that my invention eliminates or reduces advancing blade tip stall in torsionally compliant rotor blades having maximum negative twist at their blades tips.

Still viewing FIG. 3, we will see that there is drag consideration advantage to be gained by employing my invention, in addition to the aforementioned stall elimination advantages. Considering the drag situation, it will be noted by viewing FIG. 3 that in view of the high negative twist in blade tip portion 26 and the attendant high negative angle of attack $\alpha'$, a substantial drag vector D is imposed upon blade tip portion 26 through locus 38. As best illustrated in FIG. 3, this high negative twist at the blade tip portion 26 causes the blade tip portion to move nose down and to become displaced downwardly below the inboard section 42 so that locus 38 at tip portion 26 is displaced below locus 38 at inboard portion 42 by dimension A, thereby imposing a clockwise moment equal to the product A times D upon tip portion 26 to further increase the negative twist of blade tip portion 26 but, due to the offset condition of loci 38 and 40 at station 26, restoring moment M' will be accordingly increased in response to this drag moment to reduce or overcome the effects of both drag and stall and their attendant control load and performance penalties.

Traditionally, compromises have had to be made in the design of helicopter blades because of the diverse requirements of the blade for hover operation and forward flight operation. An example of such a compromise is that the aerodynamics usually require a higher degree of twist in a helicopter blade than is optimum for forward flight mode so as to achieve optimum helicopter hover mode performance. This hover required twist is usually achieved by building in the desired amount of twist while fabricating the blade. This is called built-in twist. Utilizing my invention, that is the selective placement of loci 38 and 40, the amount of blade built-in twist can be substantially reduced since, in hover, the aerodynamically induced twist due to the offset of loci 38 and 40 will be added to the built-in twist to give the desired total twist.

Still another advantage of my invention is that the increased torsional stability achieved in blade 10 by my selected placement of loci 38 and 40 will permit some repositioning of pitch axis 16 for such reasons as reducing control loads or the like under certain conditions.

It is suggested that loci 38 and 40 be displaced along blade chord S a distance approximately equal to five percent of the blade chord S at the blade tip 26 and then caused to converge until they are substantially coincident at the blade root portion 28.

I wish it to be understood that I do not desire to be limited to the exact details of construction shown and described, for obvious modifications will occur to a person skilled in the art.

I claim:
1. A helicopter blade having:
   1. a root portion,
   2. a tip portion,
   3. an airfoil portion therebetween,
   4. said tip portion being torsionally flexible and said root portion being substantially torsionally inflexible,
   5. said root portion being shaped so that the locus of shear centers and the locus of centers of lift at the root portion sections are substantially coincident, and
   6. said tip portion being shaped so that the locus of shear centers is forward of the locus of centers of lift at the tip portion sections to thereby establish an aerodynamic restoring moment in response to blade tip portion torsional excursions due to aerodynamically imposed tip portion loads thereby establishing improved blade torsional stability.

2. A helicopter blade according to claim 1 wherein the blade is of negative twist increasing between said root portion and said tip portion to be maximum at said tip portion so that said displaced loci in said tip portion will produce an aerodynamic moment to reduce or eliminate negative twist to thereby reduce or eliminate tip stall on an advancing blade at forward flight mode.

3. A helicopter blade according to claim 1 wherein said blade includes a feathering axis selectively positioned with respect to one of said loci to produce minimum control loads at a selected angle of attack, and wherein said displaced loci in said blade tip portion produce an aerodynamic restoring force to neutralize or reduce the effect of any unstable pitching moments above the blade feathering axis to thereby achieve a torsionally stable blade.

4. A helicopter blade according to claim 1 wherein said blade is of negative built-in twist, which negative built-in twist is maximum at said tip portion so that the blade tip is nose down in the advancing blade mode to thereby impose drag and an additional nose down aerodynamically created moment and attendant drag increase on the blade tip during advancing blade mode so that the tip portion is displaced downwardly from said root portion to establish a drag moment thereon, and so that said displaced loci in said tip portion will produce an aerodynamic twist restoring moment to overcome or reduce the effect of the drag moment.

5. A helicopter blade according to claim 1 wherein said tip portion has a selected span dimension running between the blade leading edge and the blade trailing edge and wherein said loci are displaced a distance of approximately five percent of the blade chord.

6. A helicopter blade according to claim 1 wherein said blade is a negative built-in twist blade with maximum negative built-in twist at said tip portion and wherein said displaced loci in said tip portion will produce an aerodynamic blade twisting moment in hover mode to bring the blade total tip twist to optimum twist for hover performance.

7. A helicopter blade according to claim 1 and including a pitch axis substantially coincident with said locus of centers of lift for substantially the full blade span.

8. A helicopter blade according to claim 1 wherein the torsional flexibility of said blade airfoil section increases between the root portion and the tip portion, with the tip portion being of maximum torsional flexibility.

9. The method of producing torsional stiffness in a torsionally flexible helicopter blade having a torsionally flexible tip and a substantially inflexible root comprising fabricating the blade so that at the blade tip the locus of centers of lift is positioned rearwardly of the locus of centers of shear and so that said loci are substantially coincident at the blade root.

* * * * *